United States Patent [19]
Bealkowski et al.

[11] Patent Number: 5,410,699
[45] Date of Patent: Apr. 25, 1995

[54] APPARATUS AND METHOD FOR LOADING BIOS FROM A DISKETTE IN A PERSONAL COMPUTER SYSTEM

[75] Inventors: Richard Bealkowski, Delray Beach; John W. Blackledge, Jr., Boca Raton; Doyle S. Cronk, Boca Raton; Richard A. Dayan, Boca Raton; Scott G. Kinnear, Boca Raton; George D. Kovach, Boca Raton, all of Fla.; Matthew S. Palka, Jr., Raleigh, N.C.; Robert Sachsenmaier, Boca Raton, Fla.; Kevin M. Zyvoloski, Raleigh, N.C.

[73] Assignee: International Business Machines Corp., Armonk, N.Y.

[21] Appl. No.: 609,043

[22] Filed: Nov. 2, 1990

Related U.S. Application Data

[63] Continuation-in-part of Ser. No. 399,631, Aug. 25, 1989, abandoned.

[51] Int. Cl.⁶ .............................................. G06F 9/06
[52] U.S. Cl. ............................ 395/700; 340/825.31; 340/825.34
[58] Field of Search ...................... 364/200, 900; 340/825.31, 825.34; 395/650, 700

[56] References Cited

U.S. PATENT DOCUMENTS

| | | | |
|---|---|---|---|
| 3,931,504 | 1/1976 | Jacoby | 235/153 |
| 3,996,449 | 12/1976 | Attanasio | 235/61 |
| 4,446,519 | 5/1984 | Thomas | 364/300 |
| 4,478,094 | 10/1984 | Salomaa et al. | |
| 4,491,914 | 1/1985 | Sujaku | 364/200 |
| 4,525,599 | 6/1985 | Curran | 178/22.08 |
| 4,562,306 | 12/1985 | Chou | 178/22.08 |
| 4,577,289 | 3/1986 | Comerford | 364/900 |
| 4,593,353 | 6/1986 | Pickholtz | 364/200 |
| 4,685,055 | 8/1987 | Thomas | 364/200 |
| 4,685,056 | 8/1987 | Barnsdale | 364/200 |
| 4,688,169 | 8/1987 | Joshi | 364/200 |
| 4,747,139 | 5/1988 | Taaffe | 380/44 |
| 4,748,561 | 5/1988 | Brown | 364/300 |
| 4,757,534 | 7/1988 | Matyas | 380/25 |
| 4,780,833 | 10/1988 | Atake | |
| 4,785,361 | 11/1988 | Brotby | 360/60 |
| 4,794,085 | 12/1988 | Jessop et al. | |
| 4,796,220 | 1/1989 | Wolfe | 364/900 |
| 4,817,140 | 3/1989 | Chandra | 380/4 |
| 5,022,077 | 6/1991 | Bealkowski et al. | 380/4 |

FOREIGN PATENT DOCUMENTS

| | | |
|---|---|---|
| 0169071 | 1/1986 | European Pat. Off. |
| 0341438 | 11/1989 | European Pat. Off. |
| WO91/16675 | 10/1991 | WIPO |

OTHER PUBLICATIONS

Japanese Pupa 61-199127-and Translation-"Microprogram Storing System" Mar. 1, 1985.
Japanese Pupa 62-162140-and Translation-"Computer System" Jan. 13, 1986.
Japanese Pupa 63-254529-and Translation-"Microprogram Controlling Type Data Processing System" Apr. 10, 1987.
Japanese Pupa 63-126056-and Translation -"Terminal Unit Control System" Nov. 14, 1986.
IBM Technical Disclosure Bulletin, vol. 21, No. 2, Jul., 1978 "Preventing Unauthorized Access to Diskette Loaded Microcode".
IBM Application System/400 System Support Diagnostic Aids (vol. 1), 1988.
IBM Enterprise Systems Architecture/370-Principles of Operation, 1988.
"Journal of Clinical Immunoassay", vol. 14, No. 2, Summer 1991.

Primary Examiner—Thomas G. Black
Assistant Examiner—Peter Y. Wang
Attorney, Agent, or Firm—Robert S. Babayi

[57] ABSTRACT

An apparatus and method for loading BIOS from a diskette drive into a personal computer system normally connected to a hardfile, such as a fixed disk. The personal computer system further includes a system processor, a random access main memory, a read only memory and a switching means. The switching means generates a signal to indicate a mode for whether BIOS loads from either diskette or disk. In a priority mode, BIOS loads immediately from diskette. In a recovery mode, BIOS loads from diskette after testing the disk subsystem.

32 Claims, 10 Drawing Sheets

ROM-BIOS

IBL OVERVIEW

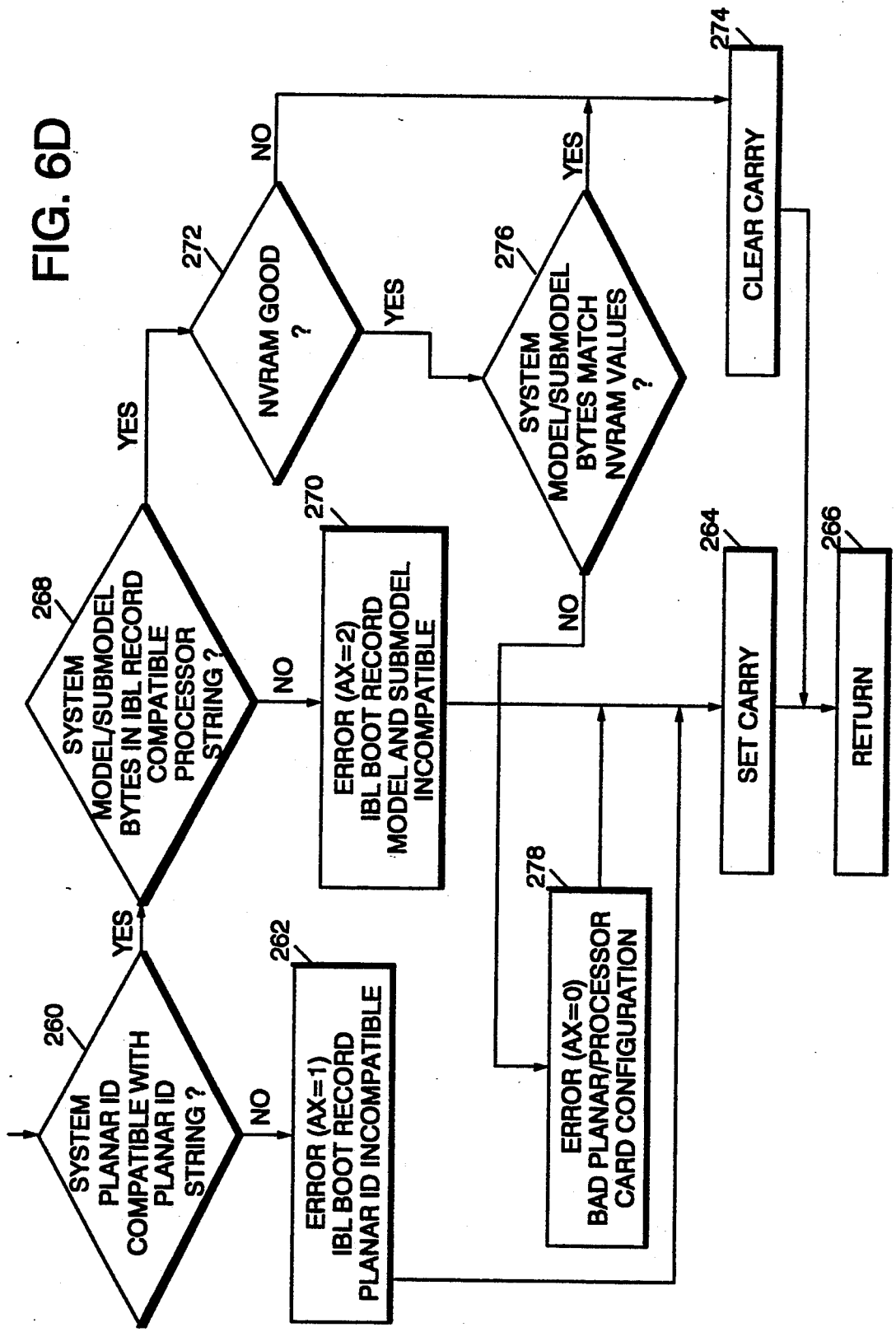

APPARATUS AND METHOD FOR LOADING BIOS FROM A DISKETTE IN A PERSONAL COMPUTER SYSTEM

This is a continuation-in-part of application Ser. No. 07/399,631 filed on Aug. 25, 1989, abandoned.

CROSS REFERENCE TO RELATED PATENT APPLICATIONS

The present patent application is one of a group of applications which concern the same overall computer system but which individually claim different inventive concepts embodied in such computer system. These related patent applications were filed on the same date, namely Aug. 25, 1989, are specifically incorporated by reference herein, and are more particularly described as follows:

(1) Application Ser. No. 07/398,865, now U.S. Pat. No. 5,210,875, entitled "Initial BIOS Load for a Personal Computer System", the inventors being Bealkowski et al.;

(2) Application Ser. No. 07/398,860, now U.S. Pat. No. 5,136,713, entitled "An Apparatus and Method for Decreasing the Memory Requirements for BIOS in a Personal Computer System", the inventors being Bealkowski et al.; and (3) Application Ser. No. 07/398,820, now U.S. Pat. No. 5,022,077, entitled "An Apparatus and Method for Preventing Unauthorized Access to BIOS in a Personal Computer System", the inventors being Bealkowski et al.

FIELD OF THE INVENTION

This invention relates to personal computer systems and in particular to a method and device for loading BIOS from a diskette into a personal computer system.

BACKGROUND DISCUSSION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70 and 80.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICROCHANNEL bus architecture exemplified by IBM's PERSONAL SYSTEM/2 Models 50 through 80.

Beginning with the earliest personal computer system of the family I models, such as the IBM Personal Computer, it was recognized that software compatibility would be of utmost importance. In order to achieve this goal, an insulation layer of system resident code, also called "microcode", was established between the hardware and software. This code provided an operational interface between a user's application program/operating system to relieve the user of the concern about the characteristics of hardware devices. Eventually, the code developed into a BASIC input/output system (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board.

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS has become a significant problem in the development cycle of the personal computer system.

For instance, with the introduction of the IBM Personal System/2 with Micro-Channel architecture, a significantly new BIOS, known as advanced BIOS, or ABIOS, was developed. However, to maintain software compatibility, BIOS from the Family I models had to be included in the Family II models. The Family I BIOS became known as Compatibility BIOS or CBIOS. However, as previously explained with respect to the IBM PERSONAL COMPUTER AT, only 32K bytes of ROM were resident on the planar board. Fortunately, the system could be expanded to 96K bytes of ROM. Unfortunately, because of system constraints, this turned out to be the maximum capacity available for BIOS. Luckily, even with the addition of ABIOS, ABIOS and CBIOS could still squeeze into 96K of ROM. However, only a small percentage of the 96K ROM area remained available for expansion. With the addition of future I/O devices, CBIOS and ABIOS will eventually run out of ROM space. Thus, new I/O technology will not be able to be easily integrated within CBIOS and ABIOS.

Due to these problems, plus the desire to make modification in Family II BIOS as late as possible in the development cycle, it became necessary to off-load portions of BIOS from the ROM. To accomplish this, portions of BIOS were stored and loaded from a fixed disk. However, it quickly became evident that loading only from a fixed disk had some limitations. Mainly, if the disk became incapacitated, the system was unusable. Also, updates to the system would lead to compatibility problems between BIOS and the new system configuration. Therefore, a need exists for loading BIOS from a direct access storage device other than the fixed disk. Also it is highly desireable to provide a priority and recovery mode for the diskette loaded BIOS. In the priority mode, BIOS is loaded immediately from diskette. In the recovery mode, BIOS is loaded from diskette only after failing to load from disk.

SUMMARY OF THE INVENTION

The present invention has been developed for the purpose of alleviating the above mentioned problems. Accordingly, the invention has as one of its objects an apparatus and method for storing and loading a portion of BIOS from a diskette drive. Another objective of the present invention is to provide an apparatus and method for loading BIOS from a diskette drive in personal computer system which normally loads BIOS from a fixed disk drive.

Yet another objective of the present invention is to provide an apparatus and method which confirms the compatibility between BIOS stored on the diskette drive and the hardware configuration of the personal computer system.

The personal computer system according to the present invention comprises a system processor, a random access memory, a read only memory, a diskette drive, a switching means and normally a disk drive. The read only memory includes a first portion of BIOS which in operation, initializes the system and detects the state of the switching means electrically coupled to the system processor. If the switching means is in a priority position, a master boot record is immediately loaded from the diskette drive (priority mode) without testing for the fixed disk drive. If the switching means is in a recovery position the first portion of BIOS attempts to load the master boot record from the fixed disk. If the fixed disk is not available, non-operational, or the master boot record on the disk is invalid, the first portion of BIOS reads in the master boot record from the diskette drive (recovery mode).

Whether loaded from the fixed disk or diskette, the master boot record includes a data segment and an executable code segment. The data segment includes data representing system hardware and a system configuration which is compatible with the master boot record. The first BIOS portion transfers control to the executable code segment which confirms the master boot record is compatible with the system hardware by verifying that the data from the data segment of the master boot record agrees with data stored in the read only memory representing the system processor, system planar, and planar I/O configuration.

If the master boot record is compatible with the system hardware, the executable code segment confirms that the system configuration has not changed and loads in the remaining BIOS portion from either the disk drive or the diskette drive into random access memory. The executable code segment then verifies the authenticity of the remaining BIOS portion and vectors the system processor to begin executing the remaining BIOS now in random access memory. BIOS executing in random access memory then boots up the operating system to begin operation of the personal computer system. The first portion of BIOS, being no longer addressable and superseded by the remaining portion of BIOS, is abandoned.

Broadly considered then, the apparatus and method for loading BIOS from diskette media includes a signal producing means, the first BIOS portion, the master boot record, signal responding means, and the remaining portion of BIOS. The signal producing means, such as the switching means, produces a signal representative of the mode for diskette loading. The signal responding means included within the first BIOS portion is responsive to the signal to determine if BIOS is loaded from diskette. The first BIOS portion initializes the system and then, if necessary, initializes the diskette to effect the loading of the master boot record into random access memory. The master boot record includes executable code which is activated by the first BIOS portion to effect the loading of the remaining portion of BIOS into random access memory.

BRIEF DESCRIPTION OF THE DRAWINGS

The foreground aspects and other features of the present invention are explained in the following written description, taken in connection with the accompanying drawings, wherein;

FIG. 6D is a flowchart showing greater detail in checking the compatibility between the master boot record and the planar/processor.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appended claims.

Figure 1:
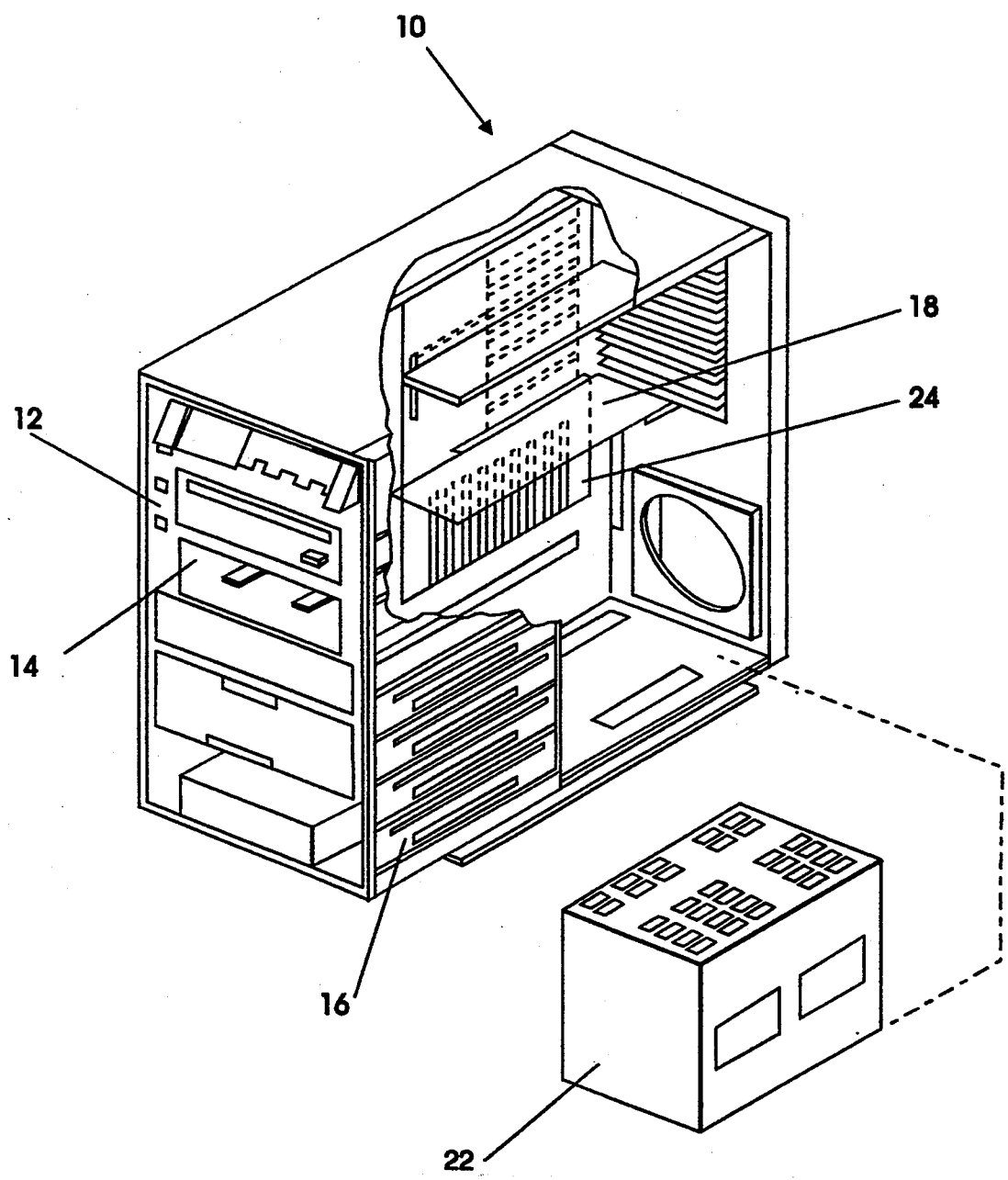
FIG. 1 illustrates a cut away view of a personal computer system showing a system planar board connected to a plurality of direct access storage devices.

Referring now to the drawings, and in particular to FIG. 1, there is shown a cutaway version of a personal computer system 10, having a plurality of DASD (Direct Access Storage Devices) 12-16 connected to a system or planar board 24 through a plurality of I/O slots 18. A power supply 22 provides electrical power to the system 10 in a manner well known. The planar board 24 includes a system processor which operates under the control of an operating system to input, process, and output information.

In use, the personal computer system 10 is designed primarily to give independent computing power to a small group of users or a single user and is inexpensively priced for purchase by individuals or small businesses. In operation, the system processor operates under the operating system, such as IBM's OS/2 Operating System or DOS. This type of operating system includes a BIOS (previously discussed and defined) interface between the DASD 12-16 and the Operating System. A portion of BIOS divided into modules by function is stored in ROM on the planar 24 and hereinafter will be referred to as ROM-BIOS. BIOS provides an interface between the hardware and the operating system software to enable a programmer or user to program their machines without an in depth operating knowledge of a particular DASD. For example, a BIOS diskette module permits a programmer to program the diskette drive without an indepth knowledge of the diskette drive hardware. Thus, a number of diskette drives designed and manufactured by different companies can be used in the system. This not only lowers the cost of the system 10, but permits a user to choose from a number of diskette drives.

Figure 2:
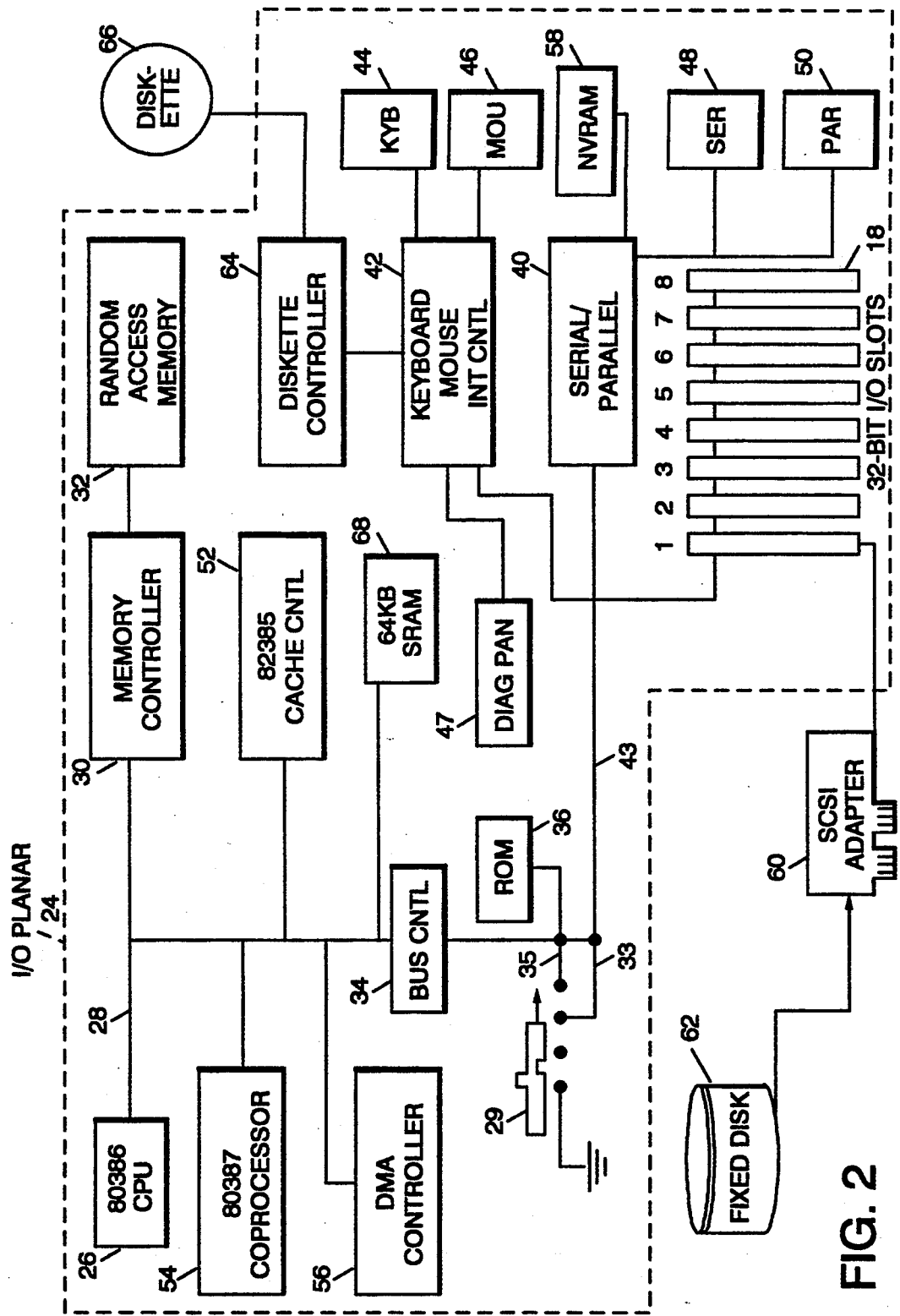
FIG. 2 shows a system block diagram for the personal computer system of FIG. 1.

Prior to relating the above structure to the present invention, a summary of the operation in general of the personal computer system 10 may merit review. Referring to FIG. 2, there is shown a block diagram of the personal computer system 10. FIG. 2 illustrates components of the planar 24 and the connection of the planar 24 to the I/O slots 18 and other hardware of the personal computer system. Located on the planar 24 is the system processor 26 comprised of a microprocessor which is connected by a local bus 28 to a memory controller 30 which is further connected to a random access memory (RAM) 32. While any appropriate microprocessor can be used, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80486 microprocessor.

Accessible by the processor is a planar identification number (planar ID). The planar ID is unique to the planar and identifies the type of planar being used. For example, the planar ID can be hardwired to be read through an I/O port of the system/processor 26 by using switches.

The local bus 28 is further connected through a bus controller 34 to a read only memory (ROM) 36 on the planar 24.

An additional nonvolatile memory (NVRAM) 58 is connected to the microprocessor 26 through a serial/parallel port interface 40 which is further connected to bus controller 34. The nonvolatile memory can be CMOS with battery backup to retain information whenever power is removed from the system. Since the ROM is normally resident on the planar, model and submodel values stored in ROM are used to identify the system processor and the system planar I/O configuration respectively. Thus these values will physically identify the processor and planar I/O configuration. The NVRAM is used to store system configuration data. That is, the NVRAM will contain values which describe the present configuration of the system. For example, NVRAM contains information describing the capacity of a fixed disk or diskette, the type of display, the amount of memory, time, date, etc. Additionally, the model and submodel values stored in ROM are copied to NVRAM whenever a special configuration program, such as SET CONFIGURATION, is executed. The purpose of the SET configuration program is to store values characterizing the configuration of the system in NVRAM. Thus for a system that is configured properly, the model and submodel values in NVRAM will be equal respectively to the model and submodel values stored in ROM. If these values are not equal, this indicates that the configuration of the system has been modified. Reference is made to FIG. 6D, where this feature in combination with loading BIOS is explained in greater detail.

Continuing, our discussion with reference to FIG. 2, the bus controller 34 is further coupled to I/O slots 18, a signal producing means such as switch 29, the serial/parallel interface 40 and peripheral controller 42 by an I/O planar bus 43. The peripheral controller 42 is further connected to a keyboard connector 44, mouse connector 46, diagnostic panel 47, and diskette controller 64. Beside the NVRAM 58, the serial/parallel interface 40 is further connected to a serial port 48 and parallel port 50 to input/output information to a printer, hard copy device, etc. As is well known in the art, the local bus 28 can also be connected to a cache controller 52, a cache memory 68, a co-processor 54, and a DMA controller 56.

The signal producing means provides signals to the processor 26 depending upon the position of the switch 29. For instance, the switch 29 is positioned to generate a signal on line 33 for effecting a diskette recovery mode in the system. Similarly, switch 29 is positioned to generate a signal on line 35 for a diskette priority mode. It is also understood that switch 29 can be replaced with hardware jumpers for effecting signals on line 33 or line 35. Additionally, as will be explained later, lines 33 and 35 can be combined into a single line for effecting a special function of the priority and recovery modes. It is also noted that switch 29 can be positioned so as not to produce either signal on line 33 or line 35.

The system processor 26 controls its internal operation as well as interfacing with other elements of the personal computer system 10. For example, system processor 26 is shown connected to a small computer system interface (SCSI) I/O card 60 which is further connected to a DASD, such as a fixed disk drive 62. It is to be understood that other than a SCSI disk drive/adapter can be used as a fixed disk in accordance with the present invention. In addition to the fixed disk 62, the system processor 26 can be interfaced to the diskette controller 64 which controls a diskette drive 66. With respect to terminology, it is also to be understood that the term "hardfile" describes fixed disk drive 62 while the term "floppy" also describes diskette drive 66.

Previous to the present invention, ROM 36 could include all of the BIOS code which interfaced the operating system to the hardware peripherals. According to one aspect of the present invention, however, ROM 36 is adapted to store only a portion of BIOS. This portion, when executed by the system processor 26, inputs from either the fixed disk 62 or diskette 66 a second or remaining portion of BIOS, hereinafter also referred to as a BIOS image. This BIOS image supersedes the first BIOS portion and being an integral part of the system, must be resident in main memory such as RAM 32. The first portion of BIOS (ROM-BIOS) as stored in ROM 36 will be explained generally with respect to FIGS. 3–4 and in detail with respect to FIGS. 6A–D. The second portion of BIOS (BIOS image) will be explained with respect to FIG. 5, and the loading of the BIOS image with respect to FIG. 7. Another benefit from loading a BIOS image from a DASD is the ability to load BIOS directly into the system processor's RAM 32. Since accessing RAM is much faster than accessing ROM, a significant improvement in the processing speed of the computer system is achieved.

The explanation will now proceed to the operation of the BIOS in ROM 36 and to the operation of loading the BIOS image from either the fixed disk or diskette to succeed the first portion of BIOS. In general, ROM-BIOS prechecks the system and loads a BIOS master boot record into RAM. The master boot record includes a data segment having validation information and a code segment having executable code. The executable code uses the data information to validate hardware compatibility and system configuration. After testing for hardware compatibility and proper system configuration, the executable code loads the BIOS image into RAM. The BIOS image succeeds ROM BIOS and loads the operating system to begin operation of the machine. For purposes of clarity, the executable code segment of the master boot record will be referred to as MBR code while the data segment will be referred to as MBR data.

Figure 3:
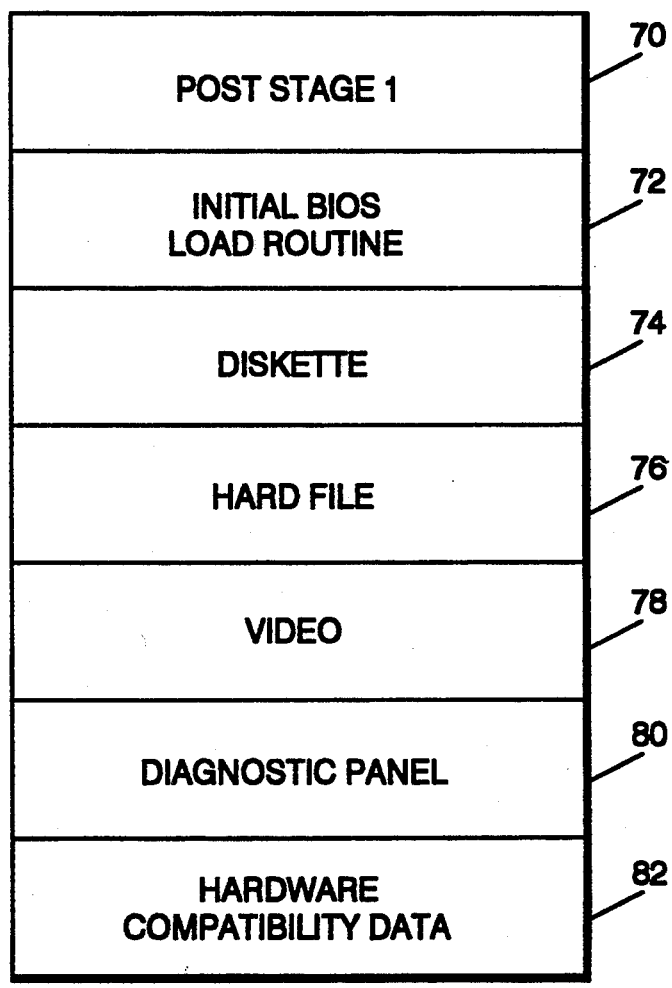
FIG. 3 is a memory map for the ROM BIOS included on the planar board.

Referring to FIG. 3 there is a memory map showing the different code modules which comprise ROM-BIOS. ROM-BIOS includes a power on self test (POST) stage I module 70, an Initial BIOS Load (IBL) Routine module 72, a Diskette module 74, a hardfile module 76, a video module 78, a diagnostic-panel module 80, and hardware compatibility data 82. Briefly, POST Stage I 70 performs system pre-initialization and tests. The IBL routine 72 determines whether the BIOS image is to be loaded from disk or diskette, checks compatibility and loads the master boot record. Diskette module 74 provides input/output functions for a diskette drive. Hardfile module 76 controls I/O to a fixed disk or the like. Video module 78 controls output functions to a video I/O controller which is further connected to a video display. Diagnostic panel module 80 provides control to a diagnostic display device for the system. The hardware compatibility data 82 includes such values as a system model and submodel values. These values are described later with respect to FIG. 5.

Figure 4:
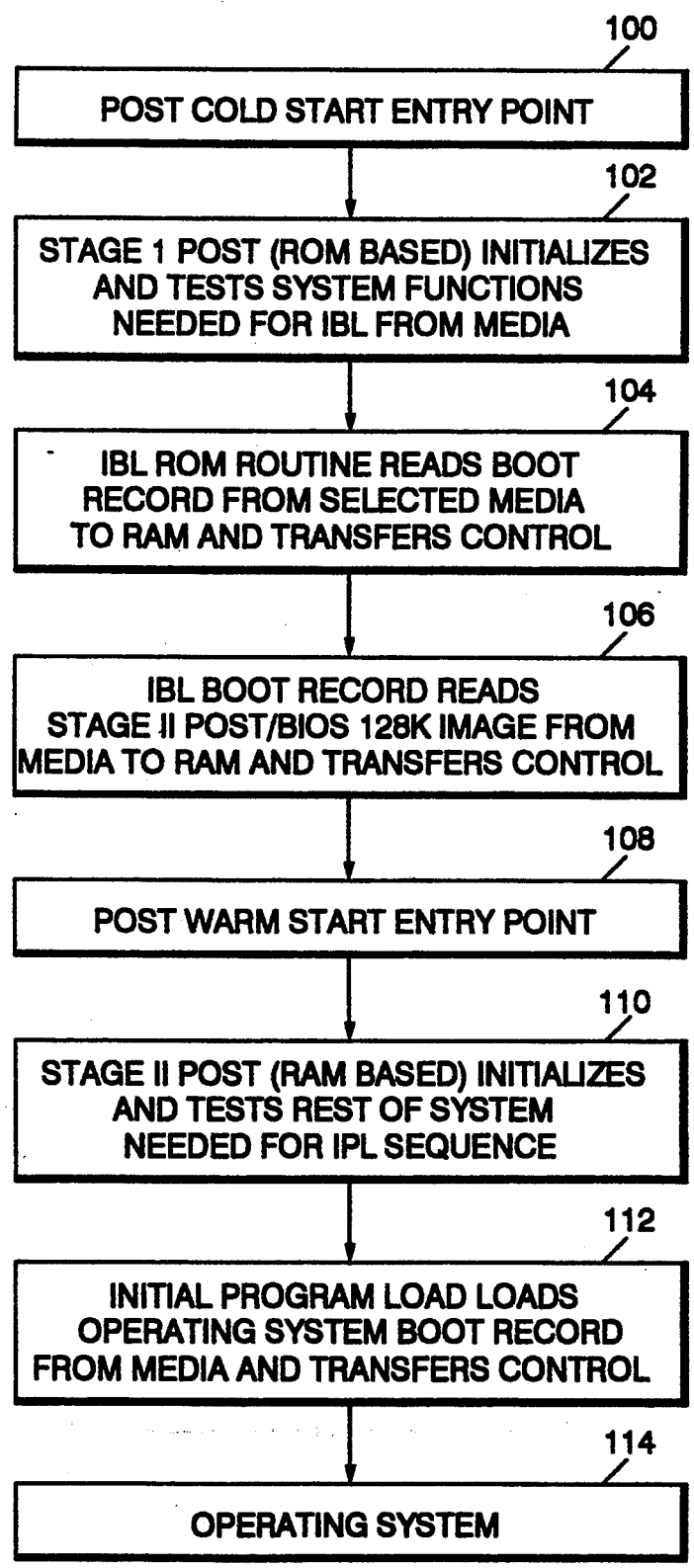
FIG. 4 is a flowchart describing the overall process for loading a BIOS image from a direct access storage device.

Referring now to FIG. 4, there is shown a process overview for loading a BIOS image into the system from either the fixed disk or the diskette. When the system is powered up or reset, the system processor is vectored to the entry point of POST Stage I, step 100. POST Stage I initializes the system and tests only those system functions needed to load the BIOS image from the selected DASD, step 102. In particular, POST Stage I initializes the processor/planar functions, diagnostic panel, memory subsystem, interrupt controllers, timers, DMA subsystem, fixed disk BIOS routine (Hardfile module 76), and diskette BIOS routine (Diskette module 74), if necessary.

After POST Stage I pre-initializes the system, POST Stage I vectors the system processor to the Initial BIOS Load (IBL) routine included in the Initial BIOS Load module 72. The IBL routine first, selects the media (disk or diskette) for loading the BIOS image; and second, loads the master boot record from the selected media into RAM, step 104. The master boot record includes the MBR data and the MBR code. The MBR data is used for verification purposes and the MBR code is executed to load in the BIOS image. A detailed description of the operation of the IBL routine is presented with respect to FIGS. 6A-D.

With continuing reference to FIG. 4, after the IBL routine loads the master boot record into RAM, the system processor is vectored to the starting address of the MBR code to begin execution, step 106. The MBR code performs a series of validity tests to determine the authenticity of the BIOS image and to verify the configuration of the system. For a better understanding of the operation of the MBR code, attention is directed to FIG. 7 of the drawings wherein the MBR code is described in greater detail.

On the basis of these validity tests, the MBR code loads the BIOS image into RAM and transfers control to the newly loaded BIOS image in main memory, step 108. In particular, the BIOS image is loaded into the RAM address space previously occupied by ROM-BIOS. That is if ROM BIOS is addressed from E0000H through FFFFFH, then the BIOS image is loaded into this RAM address space, thus superceding ROM-BIOS. Control is then transferred to POST Stage II which is included in the newly loaded BIOS image thus abandoning ROM-BIOS. POST Stage II, now in RAM, initializes and tests the remaining system in order to load the operating system boot, step 110. After the system is initialized and tested, Stage II POST transfers control to the operating system boot to load the operating system, steps 112-114.

Figure 5:
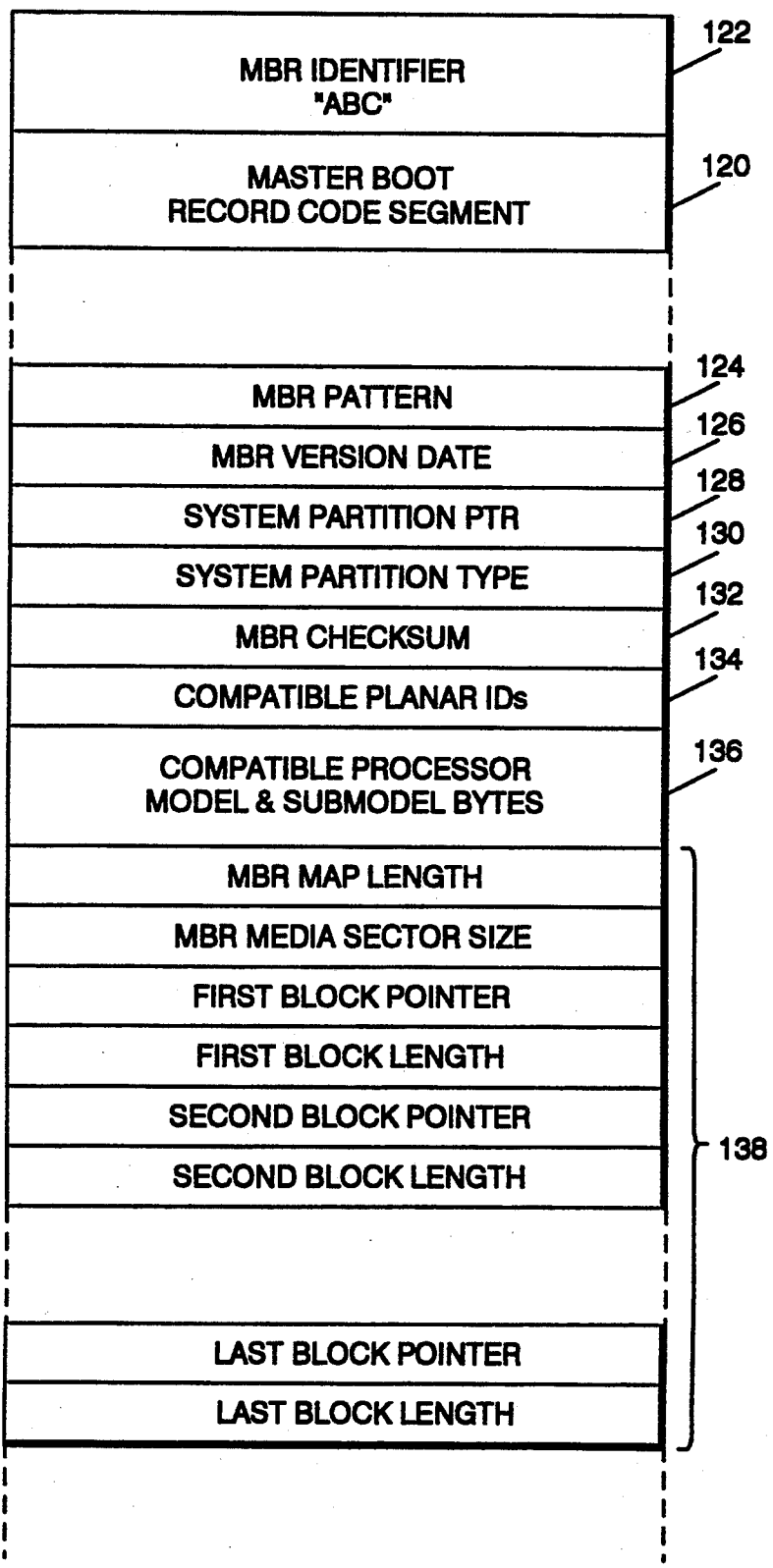
FIG. 5 illustrates the record format for the master boot record.

For clarity, it is appropriate at this point to illustrate a representation for the format of the master boot record. Referring to FIG. 5, there is shown the master boot record. The boot record includes the executable code segment 120 and data segments 122-138. The MBR code 120 includes DASD dependent code responsible for verifying the identity of the ROM-BIOS, checking that the IBL boot record is compatible with the system, verifying the system configuration, and loading the BIOS image from the selected DASD (disk or diskette). The data segments 122-138 include information used to define the media, identify and verify the master boot record, locate the BIOS image, and load the BIOS image.

The master boot record is identified by a boot record signature 122. The boot record signature 122 can be a unique bit pattern, such as a character string "ABC" in the first three bytes of the record. The integrity of the master boot record is tested by a checksum value 132 which is compared to a computed checksum value when the boot record is loaded. The data segments further include at least one compatible planar ID value 134, compatible model and submodel values 136. The master boot record's planar ID value defines which planar that the master boot record is valid for. Similarly, the master boot record's model and submodel values define the processor and planar I/O configuration respectively that the master boot record is valid for. It is noted that the boot record's signature and checksum identify a valid master boot record, while the boot record's planar ID, boot record's model and boot record's submodel comparisons are used to identify a boot record compatible with the system and to determine if the system configuration is valid. Another value, boot record pattern 124 is used to determine the validity of the ROM-BIOS. The boot record pattern 124 is compared to a corresponding pattern value stored in ROM. If the values match this indicates that a valid ROM-BIOS has initiated the load of a BIOS image from the selected media.

The following description further describes in greater detail each of the values in the master boot record and their functions:

MBR Identifier (122): The first three bytes of the IBL boot record can consist of characters, such as "ABC". This signature is used to identify a boot record.

MBR Code Segment (120): This code verifies the compatibility of the boot record with the planar and processor by comparing corresponding planar ID and model/submodel values. If these values match, it will load the BIOS image from the chosen media to system RAM. If the system image (BIOS image loaded into memory) checksum is valid and no media load errors occur, the MBR code will transfer control to the POST Stage II routine of the system image.

MBR Pattern (124): The first field of the IBL boot record data segment contains a pattern, such as a character string "ROM-BIOS 1989". This string is used to validate the ROM-BIOS by comparing the Boot Pattern value to the corresponding value stored in ROM (ROM-Pattern).

MBR Version Date (126): The master boot record includes a version date for use by an update utility.

System Partition Pointer (128): The data segment contains a media pointer to the beginning of the media system partition area for use by Stage II POST. On an IBL diskette, the pointer is in track-head-sector format; on disk the pointer is in Relative Block Address (RBA) format.

System Partition Type (130): The system partition type indicates the structure of the media system partition. There are three types of system partition structures—full, minimal and not present. The full system partition contains the setup utility and diagnostics in addition to the BIOS image and master boot record. The minimal system partition contains just the BIOS image and master boot record. It may occur where a system does not have access to a hardfile having an IBL image, in this circumstance the system partition type indicates "not present". In this instance, IBL will occur from the diskette. These three system partition types allow flexibility in how much space the system partition takes up on the media.

Checksum value (132): The MBR checksum value of the data segment is initialized to generate a valid checksum for the record length value (1.5k bytes) of the master boot record code.

MBR Planar ID Value (134): The data segment includes a value, such as a string of words defining compatible planar IDs. Each word is made up of a 16 bit planar ID and the string is terminated by word value of zero. If a system's planar ID matches the planar ID value in the master boot record, such as one of the words in the string, the IBL media image is compatible with the system planar. If the system's planar ID does not match any word in the string, the IBL media image is not compatible with the system planar.

MBR model and submodel values (136): The data segment includes values, such as a string of words defining compatible processors. Each word is made up of a model and submodel value and the string is terminated by a word value of zero. If a system's model and submodel value (stored in ROM) match one of the words in the string, the IBL media image is compatible with the system processor. If the ROM model and ROM submodel values do not match any word in the string, the IBL media image is not compatible with the system processor.

MBR Map length (138): The IBL map length is initialized to the number of media image blocks. In other words, if the BIOS image is broken into four blocks, the map length will be four indicating four block pointer/length fields. Usually this length is set to one, since the media image is one contiguous 128k block.

MBR Media Sector Size (138): This word value is initialized to the media sector size in bytes per sector.

Media image block pointer (138): The media image block pointer locates a system image block on the media. Normally, there is only one pointer since the media image is stored as one contiguous block. On an IBL diskette, the pointers are in track-head-sector format; on disk the pointers are relative block address format.

Media image block length (138): The media image block length indicates the size (in sectors) of the block located at the corresponding image block pointer. In the case of a 128k contiguous media image, which includes space for BASIC, this field is set to 256, indicating that the BIOS image block takes up 256 sectors (512 bytes/sector) starting at the media image block pointer location.

Referring now to FIGS. 6A–D, there is shown a detailed flow chart of the operation of the IBL routine. Under normal circumstances, the IBL routine loads the master boot record from the system fixed disk into RAM at a specific address and then vectors the system processor to begin executing the code segment of the master boot record. The IBL routine also contains provisions for a diskette priority mode and recovery mode in which the master boot record is loaded from diskette. In the priority mode, the master boot record is loaded directly from diskette before attempting to load from the fixed disk. The purpose of the priority mode is to bypass the error checking procedure of the disk BIOS load process. The diskette BIOS load process does not include the validity checks that are used in the fixed disk BIOS load process. This permits system updates to be loaded from diskette into the system. For example, if a new processor is added to the system, a new BIOS image is required. Since a different processor will cause a validity error when loading from fixed disk, the IBL routine provides the ability to bypass these tests by loading the BIOS image from diskette. Thus the new BIOS image, included on diskette, can be given to the user to update the BIOS image on the fixed disk.

The recovery mode permits the system to bypass testing a password stored in NVRAM. The purpose of the password is to prevent unauthorized loading from diskette, however, a recovery mode is included within the system to allow a customer engineer or the like to load from diskette for diagnostic testing. It is noted that the priority mode and recovery mode can be activated by a single switch to accomplish the same results. In this configuration, if the diskette media is not available during the priority mode, the user is given extra time (to the recovery mode check) to insert the diskette to accomplish a BIOS load from diskette. This appears to the user as a priority mode load, but in actuality is a recovery mode operation. If the IBL routine is not able to load the master boot record from either fixed disk or diskette, an error message is generated and the system is halted.

Figure 6A:
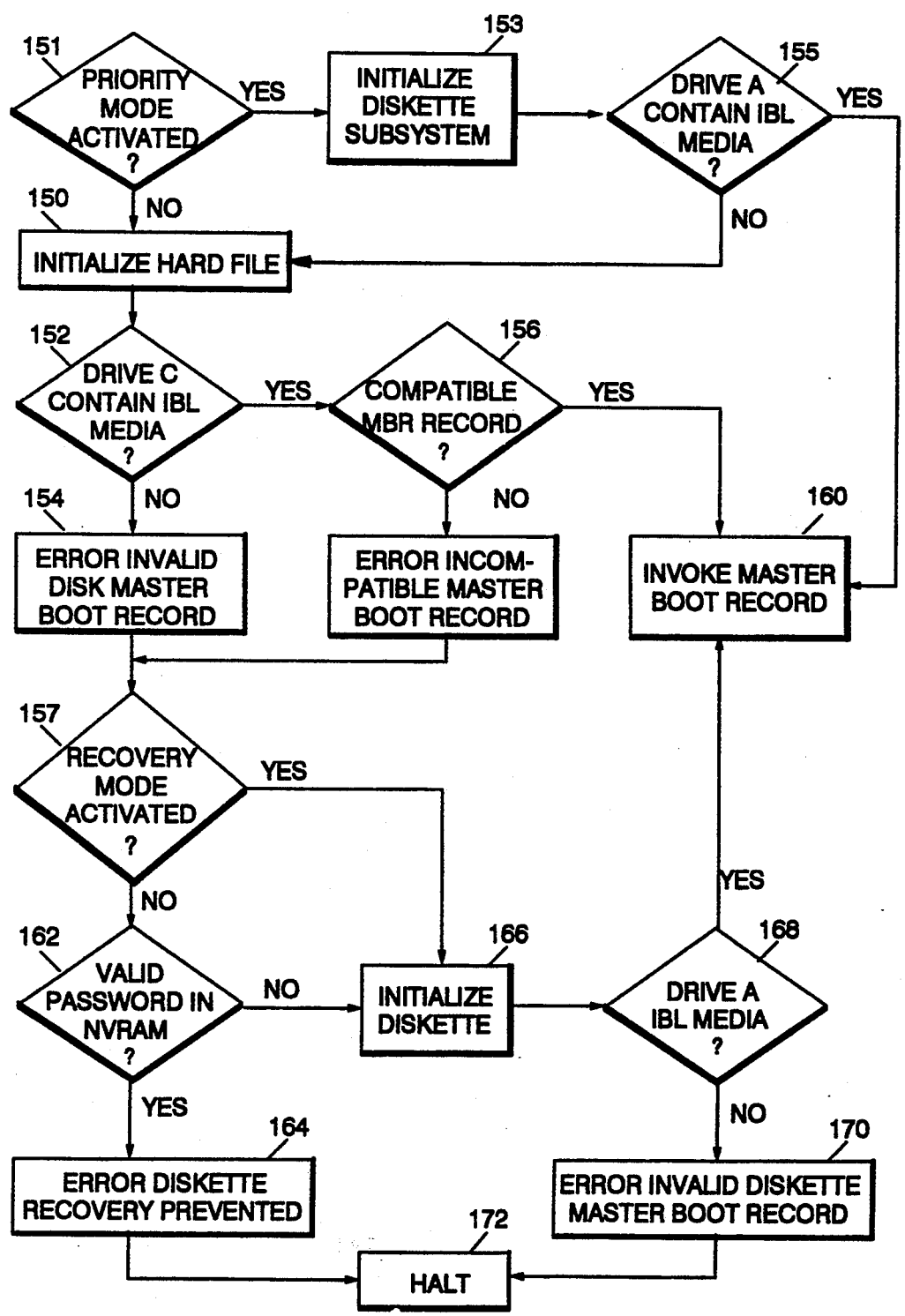
FIG. 6A is a flowchart describing the operation of the IBL routine.
Figure 6B:
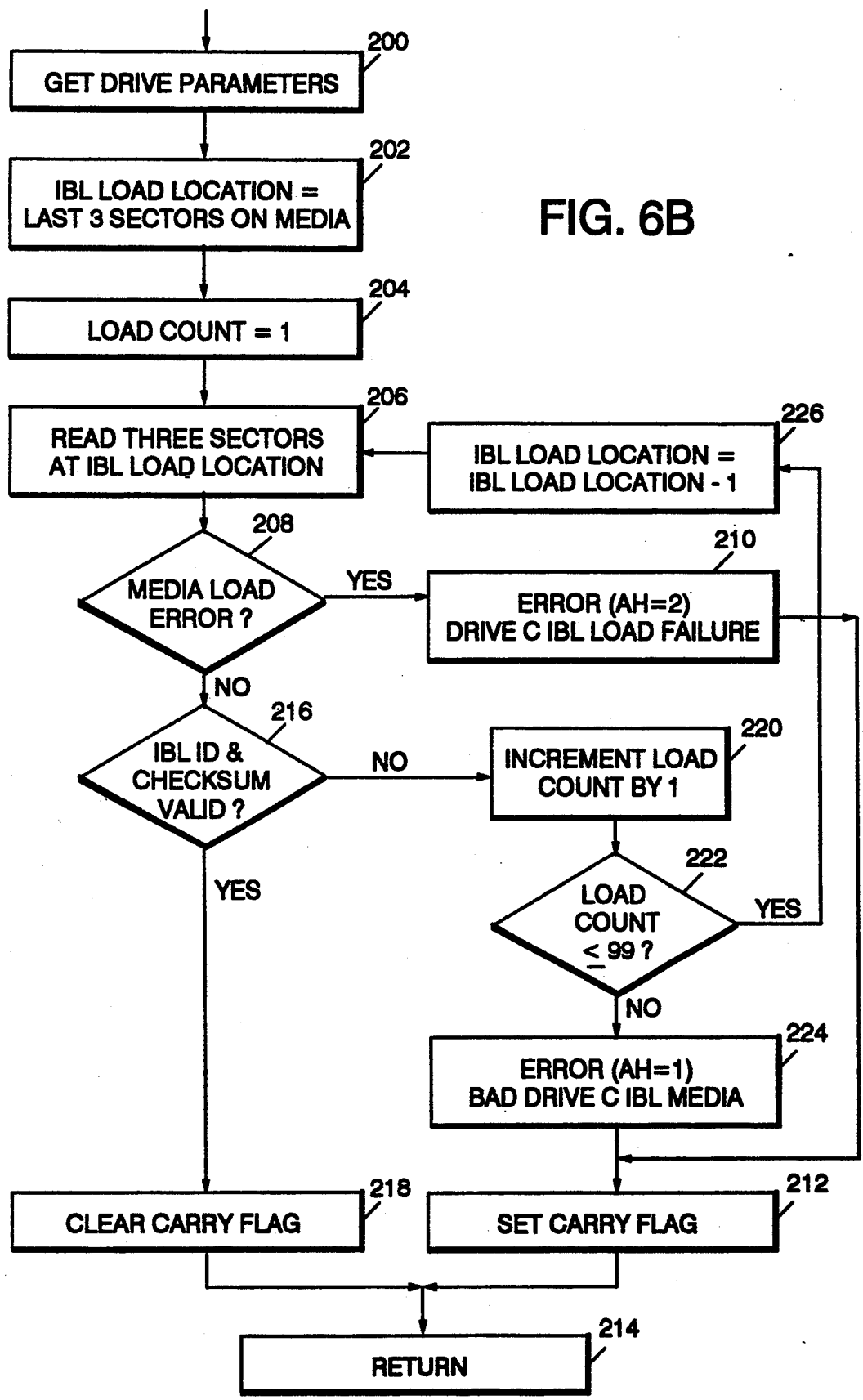
FIG. 6B is a flowchart showing the steps for loading the master boot record from a fixed disk.
Figure 6C:
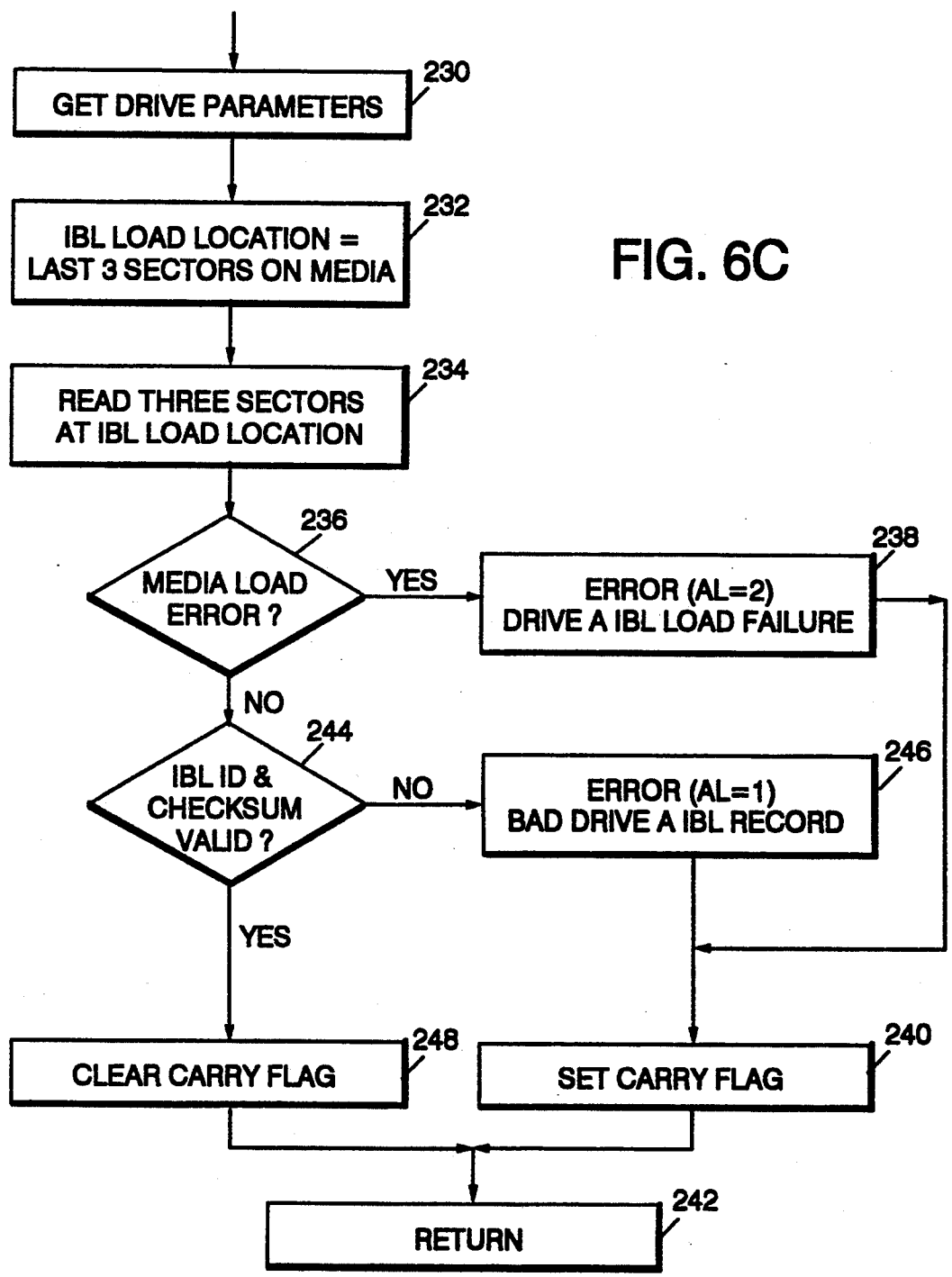
FIG. 6C is a flowchart showing the steps for loading the master boat record from a diskette.

Referring now to FIG. 6A, the switching means is tested to detect activation of the priority mode, step 151. If the priority mode is activated, the diskette subsystem is initialized, step 153. Assume for purposes of illustration that the fixed disk is configured for Drive C of the personal computer system. Similarly, assume Drive A is designated as the diskette drive. The IBL routine then examines Drive A to determine whether it contains IBL media or not, step 155. Attention is directed to FIG. 6C which describes in detail this process. If Drive A does not contain IBL media, the system attempts to load IBL media from the fixed disk, step 150. Referring back to step 155, if Drive A does include IBL media, the master boot record is loaded into RAM, step 160.

Referring back to step 151, if the priority mode is not activated, the fixed disk subsystem is initialized 150, and the IBL routine then examines Drive C to determine whether it contains IBL media, step 152. Attention is directed to FIG. 6B which describes in detail this process. If Drive C does not contain IBL media, an error is reported step 154.

Referring back to step 152, if Drive C does contain IBL media, the IBL routine starts reading from the fixed disk at the last three sectors and continues reading, decrementing the media pointer, for 99 sectors or until a valid master boot record is found. If a master boot record is found, it is checked for system planar and processor compatibility, step 156. If no master boot record is found on the last 99 sectors of the fixed disk (primary hardfile) or if it is not planar or processor compatible, then an error is reported, step 158.

Referring back to step 156, if a master boot record is found, a series of validity checks are performed to determine if the master boot record is compatible with the computer system. Additionally, the configuration of the system is checked. Attention is directed to FIG. 6D which discloses this process in greater detail. If the boot record is compatible with the planar ID, model and submodel, and if furthermore the system configuration has not changed the master boot record is loaded and the code segment of the master boot record is executed, step 160.

Referring back to steps 154 and 158, if an error occurs in loading the master boot record from the fixed disk or if a fixed disk is not available, the system determines whether the recovery mode is activated, step 157. If the recovery mode is activated a test for a valid password in NVRAM 162 is bypassed and the diskette subsystem is initialized, step 166. If the recovery mode is not activated, the system determines if a valid password is included in NVRAM, step 162. This password determines whether the BIOS image can be loaded from diskette by an unauthorized user. Note that the password will only exist in NVRAM when a user has installed it. If a password is installed in NVRAM, all users are prevented from loading the BIOS image from diskette, (other than a customer engineer) step 164. This ensures the integrity of the operation of the system by causing the system to be loaded only with the correct configuration of the BIOS image on the fixed disk. If a password exists, the diskette subsystem can not be accessed and the system halts, step 172. This password can be loaded into NVRAM during system configuration, such as when the SETUP program is executed. The password can take the form of a string of characters stored in NVRAM.

Referring back to step 162, if a valid password in NVRAM is not present, thus allowing BIOS image to be loaded from diskette, the IBL routine initializes the diskette subsystem, step 166. The IBL routine then determines if Drive A includes the IBL media on a diskette, step 168. If Drive A does not include IBL media, an error is generated to notify the user that an invalid diskette has been inserted in the drive, step 170. The system then halts, step 172. Attention is directed to FIG. 6C for a more detailed discussion of step 168.

Referring back to step 168, after Drive A is checked for IBL media, the master boot record is loaded into RAM and the code segment included in the master boot record is executed, step 160. It is important to note that for diskette the IBL routine does not include the validity checks that are used with the fixed disk system. As stated before, the reason for the absence of the validity checks is to allow future modifications in loading a new IBL image from diskette.

To recapitulate, the priority mode is tested for first. In the priority mode, if the diskette drive does not contain IBL media the system tests the fixed disk. If the fixed disk includes IBL media, the master boot record is checked for compatibility with the system through matching the system planar ID and processor model/submodel values to the boot record values. For disk, this check is done first in the IBL routine 72 and then done again in the IBL boot record. The first check (in the IBL routine) is done to make sure the boot record is compatible with the system; the second check (in the boot record) is done to ensure a compatible ROM passed control to the boot record. Notice that the check done in the disk boot record will never fail for a compatible ROM since the IBL routine will have already checked the compatibility. In contrast, the compatibility check is not done in the IBL routine for diskette. The planar/processor compatibility is checked only during diskette boot record execution. This method allows future modifications in loading a new BIOS image from a diskette. If the disk does not contain IBL media, the recovery mode and/or password are tested. If the recovery mode is activated or the password is absent, IBL media is loaded from diskette. If the recovery mode is not activated and the password is present, an error is generated and the system halts.

In view of the description of the IBL routine of FIG. 6A, the explanation will now proceed to a comprehensive and full understanding of the validity tests discussed above. Referring to FIG. 6B, there is shown a detailed flowchart of step 152 of FIG. 6A, to determine if a valid master boot record is on drive C. The process begins by obtaining the drive parameters to enable the IBL routine to access drive C, step 200. An IBL load location is set to the last three sectors from the disk (the last three sectors normally contain the master boot record), step 202. A load count indicating the number of attempts to read a master boot record from disk is set to 1, step 204. Three sectors are read from disk at the IBL load location, step 206. Any disk drive errors are detected and if a disk drive read error occurs it is reported, steps 208–210. The process then returns with an error indication, steps 212–214.

Referring back to step 208, if no drive error occurs, the disk record is scanned for the master boot record signature, step 216. The boot record signature, such as the characters "ABC", are compared to the first three bytes of the disk record. If the disk record does have a valid boot record signature (characters "ABC") and the checksum computed from the disk record loaded into memory equals the boot record checksum, the disk record is indicated as being a valid boot record with no errors, step 218. The process then returns, step 214.

Referring back to step 216, if the boot record signature or checksum is invalid, the load count is incremented by 1, step 220. The load count is then compared to a predetermined constant such as 99, step 222. If 99 attempts to read a boot record have resulted in failure, an error is indicated and the process returns, steps 224, 212 and 214. If less than 99 attempts to read a boot record have occurred, the IBL load location is decremented by one and three new sectors are read from the new load location, steps 226 and 206. Thus if a valid IBL boot record cannot be loaded from the last 99 sectors (equivalent to 33 copies) then an error condition is set and control returns to the IBL routine.

Referring now to FIG. 6C, there is shown a detailed flow diagram for loading the master boot record from diskette on drive A. First, the diskette drive parameters to access drive A are retrieved, step 230. The IBL load location is set to the last 3 sectors on diskette (cylinder, head and sector format), step 232. The last 3 sectors are read, step 234. If a diskette drive error is detected, an error is indicated, steps 236–238. An error condition is set and control is returned to the IBL routine, steps 240–242.

Referring back to step 236, if no drive error is detected, the diskette record is checked for boot record signature and the checksum is calculated, step 244. If the boot record signature is missing or the checksum is invalid, an error is indicated and control returned to the IBL routine, steps 244, 246, 240 and 242. If a valid boot record signature and valid checksum are detected an indication is set and control is returned to the IBL routine, steps 248 and 242. It is noted that in a diskette load, the IBL routine does not search through the media as in the fixed disk load. Therefore, in a diskette load, the IBL media must be stored in a specific location of the diskette.

Finally, FIG. 6D shows how the IBL routines tests for system planar and processor compatibility and for a proper system configuration. The master boot record is checked for compatibility with the system planar by comparing the boot record planar ID value to the system planar ID read by the system processor, step 260. If the system planar ID does not match the boot record planar ID value, this indicates this master boot record is not compatible with this planar. An error is indicated and control return to the IBL routine, steps 262, 264, and 266.

If the master boot record is compatible with the planar, the master boot record is checked for compatibility with the processor, step 268. The boot record model value and submodel value are compared to the model value and submodel value stored in ROM respectively. A mismatch indicates a new processor has probably been inserted and this boot record is not compatible with the new processor. An error is indicated and control returned to the IBL routine, steps 270, 264 and 266. If the master boot record is compatible with the planar and processor, the processor checks to determine if NVRAM contains reliable information, step 272. If NVRAM is unreliable, an error exists and control is returned to the IBL routine, steps 274 and 266. If NVRAM is reliable, the system configuration is checked, step 276. A change in system configuration is indicated if the model and submodel values stored in NVRAM do not match the model and submodel values stored in ROM. Note that this last comparison will only indicate a configuration error. If a configuration error is indicated, an error is generated for the user. This error notifies the user that the configuration of the system has changed since the last time SET Configuration Program was run. The user is notified of the changed configuration and control passed back to the IBL routine steps 278, 264, and 266. This error is not fatal itself, but notifies the user that SET configuration (configuration program) must be executed. Referring back to step 276, if the system model/submodel values match, an indication of compatibility is set and the routine returns, step 276, 274 and 266. Thus, the compatibility between the master boot record and the system are tested along with determining if the system configuration has been modified.

Figure 7:
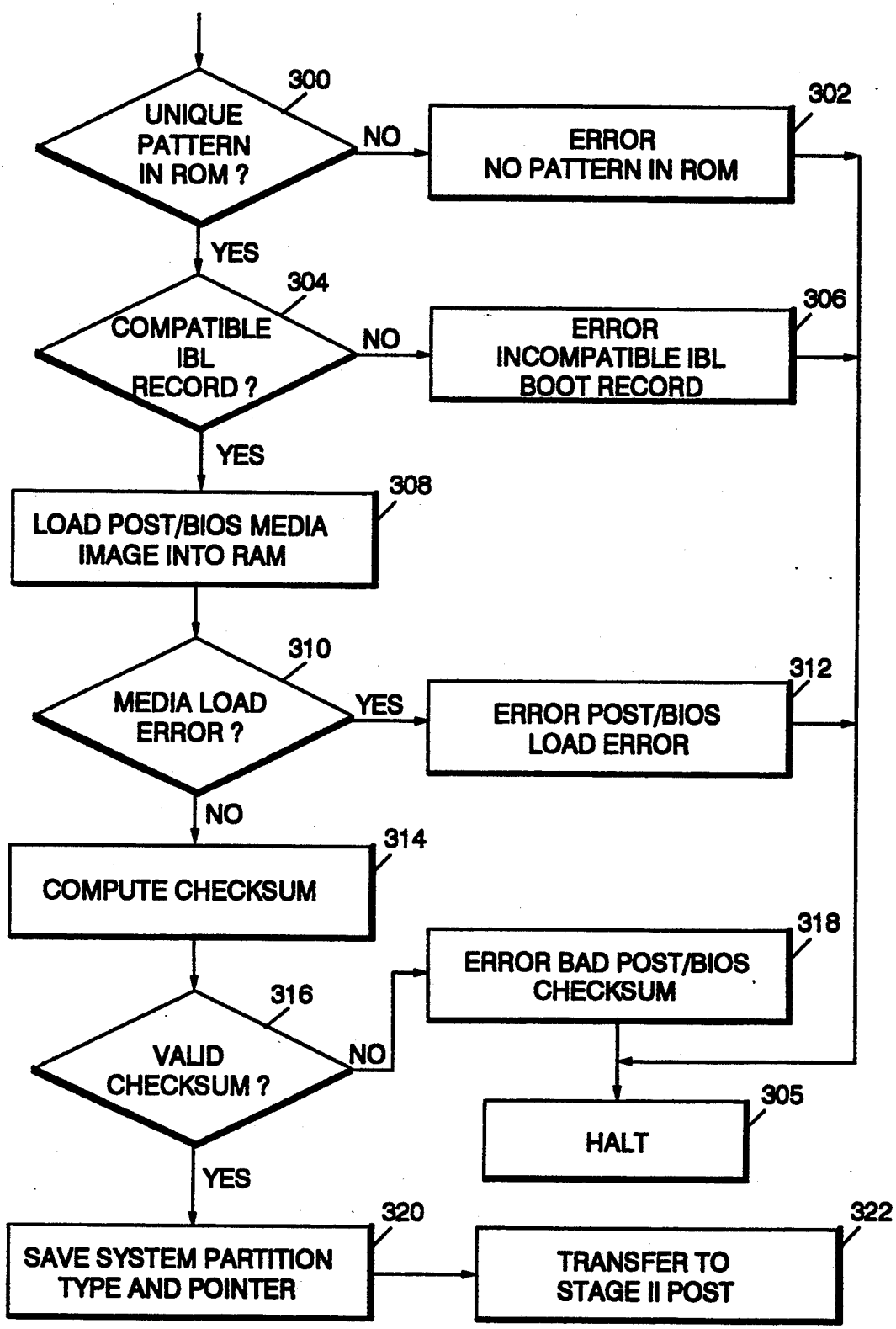
FIG. 7 is a detailed flowchart showing the execution of the master boot record to load the BIOS image from a direct access storage device.

After the IBL routine loads the master boot record into RAM, it transfers control to the MBR code starting address. Referring to FIG. 7, the executable code segment of the master boot record first verifies the boot record pattern to the ROM pattern, step 300. If the pattern in the master boot record does not match the pattern in ROM, an error is generated and the system halts, steps 302 and 305. The check for equality between ROM and boot record patterns ensures that the master boot record loaded from either the disk or diskette is compatible with the ROM on the planar board. Referring back to step 300, if the pattern in ROM matches the pattern in the boot record, the MBR code compares the system planar ID value, model and submodel value against the corresponding master boot record values, step 304. This process was discussed in greater detail with respect to FIG. 6D. If the values don't match, the master boot record is not compatible with the system planar and processor, or the system configuration has changed, and an error is generated, step 306. The system will halt when the IBL record is incompatible with the planar, model, or submodel value, step 305.

Referring back to step 304, if the system planar ID value, model and submodel values match the corresponding master boot record values, the MBR code loads the BIOS image from the selected media into the system RAM, step 308. If a media load error occurs in reading the data, step 310, an error is generated and the system halts, step 312 and 305. Referring back to step 310, if no media load error occurs, a checksum is calculated for the BIOS image in memory, step 314. If the checksum is invalid an error is generated and the system halts, step 318 and 305. Referring back to step 316, if the checksum is valid, the system partition pointers are saved, step 320, and the system processor is vectored to POST Stage II to begin loading the system, step 322.

Thus, there has been shown a method and apparatus for loading BIOS from a diskette drive in a personal computer system normally having a fixed disk drive. BIOS is loaded depending upon the position of a switch. In a priority position, BIOS is loaded from diskette before testing the fixed disk drive. In a recovery mode, BIOS is loaded from diskette after testing the fixed disk drive. In a default mode, BIOS is loaded after testing the fixed disk and for the presence of a purposely set password.

While the invention has been illustrated in connection with a preferred embodiment, it should be understood that many variations will occur to those of ordinary skill in the art, and that the scope of the invention is defined only by the claims appended hereto and equivalent.

We claim:

1. An apparatus for loading an operational interface from diskette media included in a diskette drive for a personal computer system normally connected to a hardfile, the personal computer system having a system processor, a read only memory, a random access memory and the diskette drive, said apparatus comprising:
   means for initializing the system with a first portion of the operational interface resident in the read only memory;
   means for loading a master boot record saved on the diskette media, said master boot record including an executable code segment;
   means for producing a signal, said signal being representative of loading the operational interface from the diskette drive;
   signal responding means being responsive to said signal, said signal responding means determining if the operational interface is to be loaded from the diskette drive or hardfile, wherein if the operational interface is to be loaded from the diskette media, said first portion of the operational interface initializes the diskette drive to effect the loading of said master boot record into the random access memory;
   a remaining portion of the operational interface being included in the diskette media, wherein said first portion of the operational interface transfers control to the executable code segment of the master boot record in order to effect the loading of the remaining portion of the operational interface into the random access memory.

2. The apparatus of claim 1, wherein said signal producing means generates a priority signal, said priority signal being representative of a mode wherein said master boot record and remaining portion of the operational interface are loaded into random access memory before attempting to access the hardfile.

3. The apparatus of claim 2, wherein said signal producing means generates a recovery signal, said recovery signal being representative of a mode wherein said master boot record and remaining portion of the operational interface are loaded into random access memory after attempting to load the operational interface from the hardfile.

4. The apparatus of claim 3, further including a nonvolatile memory electrically coupled to the system processor, wherein in the absence of said priority signal and said recovery signal said master boot record and said remaining portion of the operational interface are loaded into random access memory after attempting to load the operational interface from the hardfile and detecting the absence of a password normally included in the nonvolatile memory.

5. The apparatus of claim 1, wherein said signal producing means comprises a switch electrically connected to a system planar, said system planar being electrically coupled to the system processor.

6. The apparatus of claim 5, wherein said switch comprises a hardwired jumper resident on the system planar.

7. The apparatus of claim 1, wherein the master boot record further includes a data segment, the data segment representing a hardware configuration of the personal computer system which is compatible with said master boot record, and further wherein the read only memory includes data representing a hardware configuration of the system processor, wherein before said remaining portion of the operational interface is loaded into random access memory, said executable code segment compares the hardware configuration data from the master boot record with the hardware configuration data from the read only memory to verify the master boot record is compatible with the system processor.

8. The apparatus of claim 7, wherein the data segment of the master boot record includes a value representing the system planar which is compatible with the master boot record and further wherein the system planar further includes a means for uniquely identifying the system planar in order to verify that the master boot record is compatible to the system planar.

9. The apparatus of claim 7, wherein the hardware configuration data on the master boot record includes a model value and a submodel value, wherein the model value identifies a system processor which is compatible with said master boot record and the submodel value represent an I/O configuration of the system planar which is compatible with the master boot record, and further wherein said read only memory includes a corresponding model value identifying the system processor and submodel value representing the I/O configuration of the system planar, wherein said model value and submodel value of the master boot record are compared to the corresponding model and submodel values of the read only memory respectively, in order to verify that the master boot record is compatible with the system processor and the I/O configuration of the system planar.

10. The apparatus of claim 1, wherein said master boot record includes a predetermined character code in order to distinguish the master boot record from other records included on the diskette drive.

11. The apparatus of claim 1, wherein said signal producing means generates a recovery signal, said recovery signal being representative of a mode wherein said master boot record and said remaining portion of the operational interface are loaded into random access memory after attempting to load the operational interface from the disk drive.

12. An apparatus for loading an operational interface from diskette media included in a diskette drive for a personal computer system normally connected to a hardfile, the personal computer system further having a system processor electrically coupled to a read only memory, random access memory and nonvolatile memory, said apparatus comprising:
   a first portion of the operational interface resident in the read only memory, said first portion of the operational interface initializing the system and determining if the hardfile is operational;
   a master boot record included in the diskette media, said master boot record including an executable code segment;
   a password normally included in the nonvolatile memory, wherein upon determining if the hardfile is non-operational and said password is not detected, said first portion of the operational interface initializes the diskette drive to read in said master boot record; and
   a remaining portion of the operational interface being included in the diskette media, wherein the first portion of the operational interface transfers control to the executable code segment of the master boot record in order to effect the loading of the remaining portion of the operational interface into the random access memory.

13. The apparatus of claim 12, wherein the master boot record further includes a data segment, the data segment representing a hardware configuration of the personal computer system which is compatible with said master boot record, and further wherein the read only memory includes data representing a hardware configuration of the system processor, wherein before said remaining portion of the operational interface is loaded into random access memory, said executable code segment compares the hardware configuration data from the master boot record with the hardware configuration data from the read only memory to verify the master boot record is compatible with the system processor.

14. The apparatus of claim 13, wherein the data segment of the master boot record includes a value representing system planar which is compatible with the master boot record and further wherein the system planar further includes a means for uniquely identifying the system planar in order to verify that the master boot record is compatible to the system planar.

15. The apparatus of claim 13, wherein the hardware configuration data on the master boot record includes a model value and a submodel value, wherein the model value identifies a system processor which is compatible with said master boot record and the submodel value represent an I/O configuration of the system planar which is compatible with the master boot record, and further wherein said read only memory includes a corresponding model value identifying the system processor and submodel value representing the I/O configuration of the system planar, wherein said model value and submodel value of the master boot record are compared to the corresponding model and submodel values of the read only memory respectively, in order to verify that the master boot record is compatible with the system processor and the I/O configuration of the system planar.

16. The apparatus of claim 13, wherein said executable code segment generates a first error to indicate the master boot record is not compatible with the system hardware.

17. The apparatus of claim 12 wherein the nonvolatile random access memory includes data representing the system configuration, said data being updated when the configuration of the system is changed, wherein said executable code segment compares said data in the nonvolatile random access memory to corresponding data in the read only memory to determine if the configuration of the system has changed.

18. The apparatus of claim 17, wherein said executable code segment generates a second error to indicate that the system configuration has changed.

19. The apparatus of claim 12, wherein said master boot record includes an identifying means to identify the record in order to distinguish the master boot record from other records included on the diskette drive.

20. The apparatus of claim 19, wherein said identifying means comprises a predetermined character code.

21. The apparatus of claim 20, wherein said predetermined code is prefatory to said code segment of the master boot record.

22. The apparatus of claim 19, wherein said master boot record includes a checksum value to verify the validity of the master boot record when loaded into the random access memory.

23. The apparatus of claim 12, wherein said remaining portion of the operational interface includes a checksum value to verify the validity of the remaining portion of the operational interface when loaded into the random access memory.

24. The apparatus of claim 12, wherein said master boot record includes a predetermined pattern, and further wherein said read only memory includes a corresponding predetermined pattern in order to verify that the first portion of the operational interface is included within a predefined read only memory.

25. The apparatus of claim 22, wherein said executable code segment generates a third error to indicate that the read only memory is not compatible with the master boot record.

26. A personal computer system comprising:
a system processor;
a random access memory being the main memory and electrically coupled to the system processor;
a diskette drive being electrically coupled to the system processor, the diskette drive capable of storing a plurality of data records;
a master boot record included in the diskette drive, the master boot record having a data segment and an executable code segment, the data segment representing a hardware configuration of the personal computer system which is compatible with said master boot record;
a read only memory being electrically coupled to the system processor, the read only memory having data representing a hardware configuration of the system;
a first portion of an operational interface being included in the read only memory, said first portion of the operational interface initializing the system and the diskette drive to load in said master boot record and transferring control to said executable code segment, said executable code segment further comparing the hardware configuration data from the master boot record to the hardware configuration data of the read only memory to verify the compatibility of the master boot record with the system processor;
a remaining portion of the operational interface being included in the diskette drive, wherein, after verifying the compatibility of the master boot record with the system processor, executable code segment loads the remaining portion of the operational interface into the random access memory.

27. The apparatus of claim 26 further including:
a system planar board being electrically coupled to the system processor, wherein the data segment of the master boot record includes a value representing a system planar being compatible with the master boot record and further wherein the system planar further includes a means for uniquely identifying the system planar in order to verify the compatibility of the master boot record to the system planar.

28. The apparatus of claim 26 further including:
a system planar board being electrically coupled to the system processor, wherein the hardware configuration data on the master boot record includes a model value and a submodel value, wherein the model value identifies the system processor and the submodel value represent the I/O configuration of the system planar, said model value and submodel value being compared to corresponding values in the read only memory to verify the compatibility of the master boot record to the hardware configuration.

29. The apparatus of claim 26, wherein the personal computer system further includes a nonvolatile random access memory, said nonvolatile random access memory storing values representing the system configuration, said values being updated when the configuration of the system is changed, wherein said first portion of the operational interface compares said values in the nonvolatile random access memory to corresponding values in the read only memory to determine if the configuration of the system has changed.

30. A method for loading an operational interface from a diskette drive in a personal computer system normally connected to a hardfile, the personal computer system having a system processor electrically coupled to a system planar, the planar further being electrically coupled to a read only memory, random access memory and nonvolatile memory, said method comprising the steps of:
 (a) initializing the system with a first portion of the operational interface resident in the read only memory;
 (b) determining if the hardfile is present;
 (c) in the absence of the hardfile, searching the nonvolatile memory for a password;
 (d) upon detecting the absence of the password, initializing with the first portion of the operational interface the diskette drive having a master boot record a remaining operational interface;
 (c) loading with the first portion of the operational interface the master boot record into random access memory, the master boot record including a data segment and an executable code segment, the data segment having data representing the hardware configuration of the system for which the remaining operational interface is compatible;
 (d) verifying the compatibility of the master boot record with the system hardware by comparing from the data segment the data representing the hardware configuration record to corresponding data stored in read only memory;
 (e) executing the code segment of the master boot record to load the remaining operational interface code into main memory; and
 (f) passing control to the remaining operational interface code once it is loaded into main memory.

31. The method of claim 30, wherein step (d) of verifying further includes the steps of:
 (g) verifying that the boot record is compatible with the planar by comparing a planar ID accessible by the system processor with a planar ID value stored in the data segment of the boot record; and
 (h) verifying that the boot record is compatible with the system processor by comparing respectively model and submodel values stored in read only memory with model and submodel values stored in the data segment of the boot record.

32. The method of claim 30, wherein the nonvolatile random access memory includes data representing the system configuration, said method further including the step of:
 (i) comparing the data in nonvolatile random access memory to the data in read only memory to determine whether the system configuration has changed; and
 (j) generating an indication that the system configuration has changed before loading the operational interface from the diskette.

* * * * *